United States Patent [19]

Hisazumi et al.

[11] 4,221,841
[45] Sep. 9, 1980

[54] LAMINATED MATERIAL FOR PACKAGING FILM

[75] Inventors: Nobuyuki Hisazumi; Masataka Yamamoto; Tsutomu Uehara, all of Iwaki, Japan

[73] Assignee: Kureha Kagaku, Kogyo Kabushiki Kaisha, Tokyo, Japan

[21] Appl. No.: 940,118

[22] Filed: Sep. 6, 1978

[30] Foreign Application Priority Data

Sep. 13, 1977 [JP] Japan ................... 52-109431

[51] Int. Cl.² .............. B32B 27/18; B32B 27/22; B32B 27/30
[52] U.S. Cl. .................... 428/497; 428/518; 428/520; 428/522; 428/911
[58] Field of Search ............. 428/411, 518, 515, 520, 428/522, 497, 456, 911

[56] References Cited

U.S. PATENT DOCUMENTS

| | | | |
|---|---|---|---|
| 195,483 | 9/1897 | Cobb | 428/497 X |
| 1,442,012 | 1/1923 | Sumner | 428/497 X |
| 1,449,748 | 3/1923 | Gardner | 428/497 X |
| 2,968,576 | 1/1961 | Keller et al. | 428/518 X |
| 3,037,868 | 6/1962 | Rosser | 428/518 X |
| 3,325,337 | 6/1967 | Harris | 428/456 X |
| 3,488,211 | 1/1970 | Morrison et al. | 428/518 |
| 3,524,795 | 8/1970 | Peterson | 428/518 X |
| 4,048,428 | 9/1977 | Baird et al. | 428/515 X |
| 4,105,818 | 8/1978 | Scholle | 428/518 X |
| 4,121,006 | 10/1978 | Harada et al. | 428/518 X |
| 4,151,328 | 4/1979 | Kight | 428/518 X |

FOREIGN PATENT DOCUMENTS 729142  3/1966  Canada ..................... 428/518

*Primary Examiner*—Harold Ansher
*Attorney, Agent, or Firm*—Stevens, Davis, Miller & Mosher

[57] ABSTRACT

A laminated material having high workability and gas-impermeability is prepared by the lamination of a layer of vinylidene chloride copolymer containing 3 to 10% by weight of a plasticizer having a number average molecular weight of less than 500 with a carrier layer of synthetic resin containing 5 to 70% by weight of at least one organic additive having a number average molecular weight between 800 and 10,000 and selected from the group consisting of functional oligomers, fats and oils, rosin, and derivatives thereof.

14 Claims, No Drawings

LAMINATED MATERIAL FOR PACKAGING FILM

BACKGROUND OF THE INVENTION

This invention relates to laminated materials possessing a high gas-impermeability and an advantageous workability. More particularly, this invention relates to laminated materials which are prepared by laminating a layer of vinylidene chloride type resin containing a low molecular weight plasticizer with a layer containing a functional oligomer, fat and oil, etc. with or without having a thin adhesive layer interposed therebetween. These laminates are characterized by the improved gas-impermeability imparted to the laminated materials owing to transfer of the low molecular plasticizer from the vinylidene chloride resin layer into the resin layer containing the functional oligomer, oil and fat, etc.

Heretofore, compositions prepared by mixing vinylidene chloride type resins, namely vinylidene chloride-based copolymers, with suitable amounts of modifiers such as plasticizers and stabilizers were either molded alone or laminated with other resins to produce films, sheets and containers, which have found extensive utility as food packaging materials, excellent for intercepting oxygen and water vapour.

Foodstuffs which are highly perishable must be protected from contact with oxygen. Dry foodstuffs must be protected from even a slight absorption of moisture and retorted foodstuffs. However, there are cases where the ability of food packaging materials to intercept oxygen and water vapour does not prove sufficient. Thus, a need has been felt for development of new packaging materials capable of offering enhanced protection against such gaseous substances. One possible way of providing a sufficiently high gas-barrier property for these packaging materials is to increase the vinylidene chloride content of the copolymer composition. In these cases, however, the packaging materials become susceptible to thermal decomposition and discoloration because of the inevitable approximation of the decomposition temperature and the melting point of the copolymer. In order that the conventional compositions may be advantageously molded on a commercial scale by the melt extrusion method using ordinary screw type extruders without entailing thermal decomposition or discoloration, therefore, it has been necessary for compositions to contain considerable amounts of modifiers such as a plasticizer and a stabilizer. These modifiers lower the melting point and improve the thermal stability but, on the other hand, deteriorate the gas-impermeability of such a composition directly in proportion to the amount used. It has, accordingly, been customary to incorporate the modifiers in amounts from 4 to 10% by weight to suit particular uses and purposes.

Heretofore, it has been generally held that the lower limit of the combined amount of these modifiers is to be fixed at 4% by weight for the purpose of permitting the commercial manufacture of molded products to be carried out with ample smoothness of operation, and at 3% by weight for the purpose of enabling the manufacture to be effected, though at the expense of the smoothness of operation. If the amount is below the lower limit, the manufacture becomes extremely difficult and practically infeasible.

The present invention, therefore, aims chiefly to eliminate such limits imposed on the gas-impermeability and at the same time satisfy the workability requirement.

For the purpose of enabling a layer of vinylidene chloride type resin contained in laminated materials to retain the outstanding gas-impermeability of the vinylidene chloride type resin, various modifiers and liquid substances are not added at all or are added only in the minimum allowable amount into another layer adjoining this vinylidene chloride resin layer lest these modifiers and liquid substances should shift into the vinylidene chloride resin layer. When a layer of the vinylidene chloride type resin is laminated with another layer of ordinary flexible vinyl chloride type resin containing as much as ten percent of a low molecular plasticizer, for example, a large portion of the plasticizer present in the flexible vinyl chloride resin layer shifts into the vinylidene chloride type resin and consequently deteriorates its gas-impermeability. Thus, it has been found necessary to apply the laminated material to limited uses which require no appreciable preserving property or that the layer of vinylidene chloride type resin in the laminated material should possess a considerably greater thickness.

SUMMARY OF THE INVENTION

Ignoring the prevalent, accepted views, we have conceived of using a carrier comprising a resin layer containing a functional oligomer, oil and fat which possess high affinity to the low molecular plasticizer incorporated therein, via impregnation or intimate blending as an adjoining support for a layer of vinylidene chloride type resin.

According to the accepted view, it may be proper to consider that even such functional oligomers, oils and fats which are liquid substances or low melting substances would readily shift from the carrier resin layer and diffuse into the vinylidene chloride type resin layer because of their high molecular mobility and that they would consequently deteriorate the gas-barrier property of the latter layer. Surprisingly, however, in our lamination concept described above, the translocation of the low molecular plasticizer occurs virtually selectively in one direction from the vinylidene chloride type resin layer to the carrier resin layer. Even when the functional oligomer, oil and fat and other substances are contained in large excess in the carrier resin layer, their translocation to the vinylidene chloride type resin layer is extremely small. It has thus been ascertained that the selective translocation of the plasticizer greatly enhances the gas-impermeability of the vinylidene chloride type resin layer.

DETAILED DESCRIPTION OF THE INVENTION

The functional oligomers, oils and fats, etc. which can be effectively contained in at least one layer adjoining the layer of vinylidene chloride type resin are those which possess at least one functional radical selected from the group consisting of ether linkage, carbonyl, phenyl and epoxy and an average molecular weight, determined by osmometry, from 800 to 10000. The group should preferably possess a melting point lower than the melting point of vinylidene chloride type resin. Thus, any of the known substances that satisfy the foregoing requirements can be used. Use of a substance with a number average molecular weight below 800 is undesirable because the substance tends to shift readily into the vinylidene chloride type resin. In the case of a substance possessing an excessively high melting point, the translocation of the plasticizer does not occur satisfactorily unless the translocation is accelerated as by a heat treatment. So far as the circumstances permit, therefore, it is desirable to use a substance having a melting point lower than the melting point of the vinylidene chloride type resin which is the highest allowable temperature for the heat treatment. Examples of substances which satisfy all these conditions include glycerides of a higher fatty acid such as oleic acid and linoleic acid; natural vegetable oils such as olive oil, sunflower seed oil, soybean oil and linseed oil or synthetic oils and epoxides thereof; rosin and various rosin derivatives; polycondensates of dibasic acids such as adipic acid and sebacic acid with polyhydric alcohols such as ethylene glycol, propylene glycol and butylene glycol and which, as occasion demands, may be polyester-oligomeric possessing a monobasic acid or alcohol as its terminal group; epoxy resin oligomers of polycondensates of epichlorohydrin with bis-phenol, etc.; and copolymer oligomers of styrene with isobutylene, butadiene and isoprene, etc.. Of those enumerated above, oligomers are more preferable and, especially preferable are polyester oligomers which are formed between aliphatic dicarboxylic acids possessing an alkylene radical of from six to ten carbon atoms and polyhydric alcohols of from two to six carbon atoms, which have a number average molecular weight from 1000 to 3000, particularly from 1000 to 2000.

In the present invention, at least one member selected from the group consisting of such functional oligomers, oils and fats is incorporated in an amount of from 5 to 70% by weight, preferably 10–60% by weight, in the carrier resin layer via either impregnation or intimate compounding. When this amount is less than 5% by weight, the absorption of the plasticizer in the vinylidene chloride type resin is insufficient. When the amount is larger than 70% by weight, the strength of the laminated material is less than is required. Thus, any deviation of the amount from the range mentioned above is undesirable.

The carrier resin layer which carries the above-mentioned functional oligomers, oils and fats, etc. desirably has excellent adhesiveness to the vinylidene chloride type resin. Examples of resins which are advantageously used for making the carrier resin layer include homopolymers of vinyl chloride; copolymers of vinyl chloride with at least one monomer selected from the group consisting of vinyl acetate, vinylidene chloride, acrylonitrile, ethylene, acrylic esters, methacrylic esters, and alkyl vinyl ethers; vinyl chloride type resins such as chlorinated polyethylenes and chlorinated polyvinyl chloride; homopolymers or copolymers of at least one monomer selected from the group consisting of butadiene, isoprene, styrene, methyl methacrylate and acrylonitrile, copolymers of ethylene with vinyl acetate and partial saponification products thereof. Of the various resins enumerated above, vinyl chloride type resins are particularly advantageous. Use of a flexible vinyl chloride type resin is advantageous in the sense that the resin offers high adhesiveness to the vinylidene chloride type resin layer and brings about a desirable effect in the thermal molding of vacuum packages as will be described later.

The vinylidene chloride type resin which is used in the present invention comprises 100 parts by weight of a copolymer formed of 60 to 95% by weight of vinylidene chloride and the balance of a monomer copolymerizable with vinylidene chloride and 3 to 10 parts by weight of a low molecular weight plasticizer and, when necessary, may additionally contain adjuvants such as stabilizers and coloring agents. Examples of copolymerizable monomers which are usable in the vinylidene chloride type resin include vinyl chloride, acrylonitrile, acrylic acid and methacrylic acid; and unsaturated monomers such as alkyl esters of acrylic acid possessing an alkyl radical of from one to 18 carbon atoms, alkyl esters of methacrylic acid possessing an alkyl radical of from one to 18 carbon atoms, maleic anhydride, maleic acid, alkyl esters of maleic acid, itaconic acid, alkyl esters of itaconic acid, vinyl acetate, ethylene, propylene, isobutylene and butadiene. One monomer or a mixture of two or more monomers selected from this group may be used.

The plasticizer desirably has a high diffusion velocity and must possess an number average molecular weight, determined by osmometry, of not more than 500. Examples of plasticizers which are effectively usable include esters of dibasic aliphatic acids such as dioctyl adipate, dioctyl sebacate, and dibutyl sebacate; phthalic esters such as dioctyl phthalate; hydroxy polycarboxylic esters such as tributyl citrate, and tributyl acetylcitrate; glycerol esters such as glycerol tributyrate; epoxides such as octyl epoxystearate and dioctyl epoxyhexahydrophthalate (a plasticizer containing an epoxy radical may serve as a combined stabilizer and plasticizer). One plasticizer or a mixture of two or more plasticizers selected from the foregoing group may be used. The amount of plasticizer is desirably not less than 4 parts by weight, because molding of the vinylidene chloride resin is difficult where the amount of the plasticizer is less than 3 parts by weight. On the other hand, plasticizer in excess of 10 parts by weight is practically unnecessary. Thus, the amount of the plasticizer is limited to the range of from 3 to 10 parts by weight.

The laminated film of the present invention consists of at least two layers, one being the aforementioned layer of vinylidene chloride type resin and the other being a carrier resin layer containing a functional oligomer, oil and fat, etc. The latter layer is joined to at least one of the two surfaces of the former layer with or without having a thin adhesive layer interposed therebetween.

When the laminated film of the present invention is left to stand at normal room temperature for a long time, the low molecular plasticizer gradually shifts into the carrier resin layer and eventually imparts high gas-impermeability to the film. Accelerated development of this gas-impermeability is advantageously obtained by using a smaller amount of the low molecular weight plasticizer, approaching the allowable minimum, at which point the film still offers sufficient workability, adding a greater amount of oligomer, oil and fat, etc. and subjecting the finally produced film to a heat treatment at the highest allowable temperature at which other properties of the film remain unaffected.

Basically, the laminated material of this invention comprises the layer of vinylidene chloride type resin containing the low molecular plasticizer and the adjoining resin layer containing the functional oligomer, oil and fat, etc. It may additionally have another resin layer such as, for example, a resin layer containing absolutely no additives such as plasticizer, oligomer, oil and fat joined to at least one surface of either of the two main layers mentioned above or interposed between the two main layers. When the layer containing absolutely no additive is used as a surface layer of the laminated film which is particularly intended as food packaging material, it offers the advantage that it prevents foodstuffs from coming into direct contact with the layer containing the plasticizer. Moreover, the adhesiveness of this surface layer to another resin sheet can be improved, and the workability of the laminated sheet can be freely modified, by suitably selecting the resin of which the surface layer is made.

When the layer containing absolutely no additive is interposed between the layer of vinylidene chloride type resin and the adjoining resin layer containing the functional oligomer, oil and fat, etc., it must be as thin as possible in order to avoid interfering with the translocation of the low molecular plasticizer to avoid enhancing the adhesion between the two layers. For this purpose, the interposed layer desirably has a thickness not exceeding $5\mu$.

For example, a laminated film is formed by joining the carrier resin including the oligomer, oil and fat, etc. in the form of a layer of vinyl chloride type resin to a vinyl chloride type resin layer or vinylidene chloride type resin layer, which resin layer has, on either or both surfaces, a thin layer of a resin of low softening point selected from the group consisting of low-density polyethylene, ethylene-vinyl acetate copolymer resin, ethylene-unsaturated organic acid copolymer and ionomers thereof. This laminated film provides an ideal packaging film for vacuum forming under heating in the sense to be described below, because the flexible vinyl chloride type resin exhibits conspicuous elastic recovery at temperatures above 60° C., preferably 80° C. The vacuum packaging is started with a packaging procedure which, similarly to the procedure for blister packaging, comprises shape-forming the afore-mentioned laminated film with a metal die to the general shape of the article being wrapped up, placing the article in the recesses consequently formed in the laminated film and joining the base film prepared separately with the planar bottom portion of the shape-formed laminated film, or placing the article on the base film corresponding to the above-mentioned recess in the laminated film and joining the laminated film with the base film. Then the recesses of the film are evacuated and thereafter the spaces between the metal die and the shape-formed laminated film are changed from the state of vacuum to the state of an atmospheric pressure. Consequently, the change of the pressure and the power of elastic recovery of the shape-formed laminated film cooperate with each other, enabling the laminated film to wrap the article tightly without producing any wrinkle. In this case, the deforming stress generated under application of heat is greatly alleviated by the surface layer having a low softening point. Thus, the laminated film substantially functions as a rubbery elastomer. Moreover, since the layer of vinylidene chloride type resin is hardly deformed plastically at a normal room temperature and acquires enough toughness to withstand the residual stress of the rubbery elastomer layer, no appreciable compressive strength is exerted on the article being wrapped up.

When the laminated film is used for packaging soft materials such as ham and sausage, for example, the laminated film does not compress the contents with more pressure than is necessary for tight packaging, and consequently crush the material or squeeze the juice out of the material, nor is there any possibility that the residual strain will cause separation of the seal along the line of close adhesion between the laminated film and the base film.

The film of such nature can be used, either in conjunction with the base film or all by itself, for vacuum packaging a given article without resort to the shape-forming technique using metal dies. Thus, the laminated film of this invention is literally an epoch-making material for vacuum packaging.

The laminated film of the present invention can also be used for various purposes other than the purpose of vacuum packaging. In the case of the conventional laminated material which is comprised of a vinyl chloride type resin and a vinylidene chloride type resin, for example, since the plasticizer shifts into the vinylidene chloride type resin as described previously, there is an inevitable disadvantage of the gas-impermeability of the laminated material being deteriorating as a result and the plasticizer itself exuding onto the surface of the laminated laminate, consequently impairing the adhesiveness of the material with the other material. The present invention imparts ample flexibility to the laminated material, notably improves the gas-barrier property of the material, controls the phenomenon of sweating and enhances the adhesiveness of the laminate with other material, enabling the conventional laminated material to be converted into a highly convenient material usable for bag-in-box packaging, pouch packaging, blister packaging, etc.

By converting the combination which has heretofore been rejected as unsuitable into a desirable, advantageous combination as described above, the present invention has proved to be a highly significant and useful achievement for the industry.

The laminated material of the present invention can be manufactured by any of the known methods of lamination such as the coextrusion method, the lamination method, or even by combination of two such known methods.

The present invention will be described in detail hereinbelow with reference to the following working examples:

EXAMPLE 1

With 100 parts by weight of a copolymer consisting of 80% by weight of vinylidene chloride and 20% by weight of vinyl chloride were mixed 1 part by weight of epoxidized soybean oil as a stabilizer and 8 parts by weight of dibutyl sebacate as a low molecular plasticizer. The resultant compound was melt extruded with an ordinary screw-type extruder and inflation molded to produce a film (A) of $50\mu$ in thickness.

An amount of polyvinyl chloride was mixed with 40% by weight of an oligomer with an number average molecular weight of 1700, made by polycondensation of adipic acid with butylene glycol, and having acetylated terminal groups, and the mixture was melt-extruded by an ordinary method using a screw-type extruder provided with a T die, to produce a film (B) of $200\mu$ in thickness.

A laminated material of the construction of (B)/(A)/(B) was produced from the two films (A) and (B) by means of hot rolls.

The permeability to oxygen at 30° C. of the three-ply laminated film was found to be 220 cc/m$^2$·24 hours immediately after the lamination. When the film was given a heat treatment at 80° C. for five hours, the permeability sharply fell to 50 cc/m$^2$·24 hours. In the case of a sample which was left to stand at room temperature for two weeks, the permeability was 35 cc/m$^2$·24 hours. This indicates that the gas-impermeability of the three-ply laminated film was notably improved when the film was left to stand at room temperature and when it was subjected to the accelerated treatment at elevated temperatures. The fact that the improved gas-impermeability was brought about by the translocation of the dibutyl sebacate originally present in the layer (A), the layer of vinylidene chloride type copolymer, to the layer (B), the layer of vinyl chloride resin containing the polyester-oligomer, was evidenced by the analysis of the layer of vinylidene chloride type resin for dibutyl sebacate content (in % by weight) by use of n-hexane as an extractant, which gave the values of 7.3, 4.3 and 3.9 respectively immediately after the lamination, after five hours' accelerated treatment and after two weeks' standing at room temperature. The extracts, when developed by paper chromatography, were found to contain no detectable oligomer.

Referential Example 1

The procedure of Example 1 was repeated, except that the polyester-oligomer was substituted by dioctyl adipate as a low molecular plasticizer. The permeability to oxygen at 30° C. of the laminated material was 220 cc/m$^2$·24 hours immediately after the lamination. After an accelerated treatment performed at 80° C. for five hours, the permeability rose to 270 cc/m$^2$·24 hours. During two weeks' standing at room temperature, the permeability sharply rose to 560 cc/m$^2$·24 hours. These results clearly indicate that the gas-impermeability of the laminated film was markedly deteriorated by the accelerated heat treatment as well as by the standing at room temperature. The fact that the deterioration of the gas-impermeability was caused by the translocation of excess low molecular plasticizer from the carrier resin layer into the layer of vinylidene chloride type resin was evidenced by the analysis of the layer of vinylidene chloride resin for its total plasticizer content, which showed an increase of 0.2% by weight after five hours' accelerated heat treatment and an increase of 2.0% by weight after two weeks of standing at room temperature.

Referential Example 2

The procedure of Example 1 was repeated, except that the addition of polyester-oligomer was completely omitted. The permeability to oxygen at 30° C. of the laminated film was 220 cc/m$^2$·24 hours immediately after the lamination. After five hours' accelerated heat treatment, the permeability was 210 cc/m$^2$·24 hours. Even after two weeks' standing at room temperature, the permeability remained at 210 cc/m$^2$·24 hours. Thus, substantially no change was observed in the gas-impermeability of the laminated film.

EXAMPLE 2

Two sheets of 1 mm in thickness were prepared by using a mixture of 100 parts by weight of a vinyl chloride-vinyl acetate copolymer (with a vinyl acetate content of 15% by weight) with 50 parts by weight of sunflower-seed oil. Separately, a film of 40$\mu$ thickness was prepared by using a mixture of 100 parts by weight of a vinylidene chloride-vinyl chloride copolymer (with a vinylidene chloride content of 35% by weight) with 5 parts by weight of dibutyl sebacate. The two sheets and the one film interposed between the sheets were laminated by the method of Example 1 and then left to stand in an oven at 40° C. to test for translocation of the plasticizer and the oil. The amount of dibutyl sebacate remaining in the vinylidene chloride type resin was 3.7% by weight after one day's standing, 2.8% by weight after three days' standing and 2.1% by weight after 10 days' standing. On the other hand, the translocated amount of sunflower oil into the polyvinylidene chloride film was only 0.6% by weight after immersion of the film into the oil for 10 days.

The permeability to gas of the film of 40 microns in thickness which had been found to be 60 cc/m$^2$·24 hours before the treatment was conspicuously lowered to 22 cc/m$^2$·24 hours after 10 days' immersion in sunflower oil.

EXAMPLE 3

100 parts by weight of a copolymer composed of 80% by weight of vinylidene chloride and 20% by weight of vinyl chloride were mixed 1 part by weight of epoxidized soybean oil as a stabilizer and 4 parts by weight of dioctyl adipate as a low molecular plasticizer. The compound (C) thus produced was melt-extruded. Separately, the carrier resin (B) of Example 1 was melt-extruded by another extruder. These resins were extruded through a circular die to form a three-ply, (B)/(C)/(B), construction. Upon discharge from the die, the film was inflated in the form of a bubble with blown air to decrease its wall thickness and to produce a three-ply film composed of the (B)/(C)/(B) layers of 30$\mu$/25$\mu$/30$\mu$ in thickness.

A single-layer film of (C) of 30$\mu$ in thickness and a single-layer film of (B) of 20$\mu$ in thickness were separately prepared for the purpose of comparison of permeability to oxygen. These single-layer films were piled up in the same construction as the aforementioned co-extruded three-ply laminated film (B/C/B) The laminated film and the simple aggregate of single-layer films were tested for permeability to oxygen at 30° C. After three days' standing at room temperature, the permeability was found to be 83 cc/m$^2$·24 hours for the simple aggregate of three-ply films and 50 cc/m$^2$·24 hours for the co-extruded three-ply laminated film. This indicates that the present invention improved the gas-barrier property of the film. The co-extruded film of the present invention was found to serve advantageously as a film of excellent gas-barrier property for vacuum packaging with heating.

EXAMPLE 4

The films (B) and (C) of Example 3 and a film (D) of ethylene-vinyl acetate copolymer (with a vinyl acetate content of 15% by weight) possessing good adhesiveness with vinylidene chloride copolymer resin were separately prepared by use of an extruder. By the procedure of Example 2, a three-ply film formed of the films (B)/(C)/(D) of 30$\mu$/25$\mu$/30$\mu$ in thicknesses was obtained from the films described above. At the same time, a six-ply film formed of the same films each with a halved thickness in the construction of (D)/(C)/(B)/(B)/(C)/(D) was prepared.

The permeability to oxygen at 30° C. of the three-ply film and that of the six-ply film were both 63 cc/m$^2$·24 hours after three days' standing at room temperature. Comparison of this value with 83 cc/m$^2$·24 hours, a value found for the simple aggregate of three one-ply films, clearly indicates that the laminated film of the present invention acquired an improved gas-impermeability.

The co-extruded film obtained in this example was found to be advantageous as a film of excellent gas-impermeability for vacuum packaging.

Referential Example 3

The procedure of Example 3 was repeated, except that the oligomer in the film (B) was replaced by 40% by weight of dioctyl adipate. The permeability to oxygen at 30° C. of the laminated film consequently obtained was 260 cc/m$^2$·24 hours after three days' standing. Comparison of the results with those of Example 2 shows that the film of this example had an extremely inferior gas-impermeability.

EXAMPLE 5

As component films, the films (B) and (C) used to construct the film of Example 3, a film (E) of the sodium compound of an ethylene-methacrylic acid copolymer (tradename "Surlyn", made by duPont), and a film (F) of a styrene-isoprene block copolymer (with a styrene content of 14% by weight) as an adhesive for the films (C) and (D) were prepared. A four-ply film was formed of the films (B)/(C)/(F)/(E) of 30μ/25μ/5μ/25μ in thicknesses.

The permeability to oxygen at 30° C. of this four-ply film was 60 cc/m$^2$·24 hours after three days' standing at room temperature. Comparison of this value with 83 cc/m$^2$·24 hours, a value found for a simple aggregate of individual component films, indicates that the laminated film of this invention acquired an improved gas-impermeability.

EXAMPLE 6

A laminated film was obtained by following the procedure of Example 1, except that an adhesive layer of thermosetting polyurethane was applied 3μ in thickness to the interface of the component films (A) and (B) used in Example 1. The permeability to oxygen of the laminated film at 30° C. was 220 cc/m$^2$·24 hours immediately after the lamination. The permeability fell sharply to 55 cc/m$^2$·24 hours after five hours' heat treatment at 80° C. After two weeks' standing at room temperature, the permeability fell to 40 cc/m$^2$·24 hours. The results show that the gas-impermeability of this laminated film was conspicuously improved by the accelerated treatment at elevated temperatures as well as by the prolonged standing at room temperature. The fact that the improved gas-impermeability was brought about by the translocation of dibutyl sebacate originally present in the layer (A) into the layer (B) was evidenced by the analysis of the layer (A) for dibutyl sebacate content (in % by weight), which gave the values of 8, 4.6 and 4.1 respectively immediately after the lamination, after five hours' accelerated treatment and after two weeks' standing at room temperature.

What is claimed is:

1. A laminated material having high workability and gas-impermeability, said laminate material being prepared by laminating a layer of vinylidene chloride copolymer containing 3 to 10% by weight of a plasticizer having a number average molecular weight of less than 500 with a carrier layer of synthetic resin containing 5 to 70% by weight of at least one organic additive having an average molecular weight in the range of from 800 to 10,000, and being a functional oligomer, fat, oil, or rosin.

2. The laminated material of claim 1, wherein the layer of vinylidene chloride copolymer and the carrier layer have a thin layer of adhesive material interposed therebetween.

3. The laminated material of claim 2, wherein the interposed thin layer of adhesive material is less than 5μ in thickness.

4. The laminated material as set forth in claims 1, 2 or 3, wherein the carrier layer is made of a homopolymer or copolymer of vinyl chloride.

5. The laminated material as set forth in claims 1, 2 or 3, wherein the organic additive has a melting point lower than the melting point of the copolymer of vinylidene chloride.

6. The laminated material as set forth in claims 1, 2 or 3, wherein the organic additive is selected from the group consisting of glycerides of higher fatty acids, vegetable oils and derivatives thereof, and rosin and derivatives thereof.

7. The laminated material as set forth in claims 1, 2 or 3, wherein the organic additive is a functional oligomer having at least one functional member selected from the group consisting of ether linkage, carbonyl radical, phenyl radical and epoxy radical.

8. The laminated material of claim 7, wherein the functional oligomer is selected from the group consisting of polyester-oligomers, epoxy resin oligomers and styrene cooligomers.

9. The laminated material of claim 8, wherein the functional oligomer is a polyester-oligomer having a number average molecular weight of from 1000 to 3000 and formed of an aliphatic dicarboxylic acid possessing an alkylene radical of from six to ten carbon atoms and a polyhydric alcohol having from two to six carbon atoms.

10. The laminated material as set forth in any one of claims 1 to 9, wherein the plasticizer in the layer of vinylidene chloride copolymer is selected from the group consisting of esters of aliphatic dibasic acids, esters of phthalic acid, esters of hydroxy-polycarboxylic acid, glycerol esters and epoxides.

11. The laminated material as set forth in any one of claims 1 to 10, wherein the carrier layer contains the organic additive therein in the amount of from 10 to 60% by weight.

12. The laminated material as set forth in any one of claims 1 to 11, wherein the layer of vinylidene chloride copolymer is made of a copolymer of 60 to 95% by weight of vinylidene chloride, and the balance of a monomer copolymerizable with vinylidene chloride.

13. The laminated material of claim 12, wherein the copolymerizable monomer is at least one member selected from the group consisting of vinyl chloride, acrylonitrile, acrylic acid, methacrylic acid; alkyl esters of acrylic acid possessing alkyl radicals of one to 18 carbon atoms, alkyl esters of methacrylic acid having from one to 18 carbon atoms, maleic anhydride, maleic acid, alkyl esters of maleic acid, alkyl esters of itaconic acid, vinyl acetate, ethylene, propylene, isobutylene and butadiene.

14. The laminated material as set forth in any one of claims 1 to 13, wherein the material is in the form of a packaging film.

* * * * *